(No Model.)
E. THOMSON.
METHOD OF ELECTRICALLY WELDING CHAINS AND LINKS.
No. 385,385. Patented July 3, 1888.
Fig. 1.   Fig. 2. 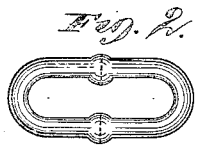  Fig. 3. 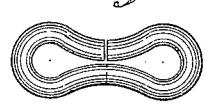

Fig. 7. 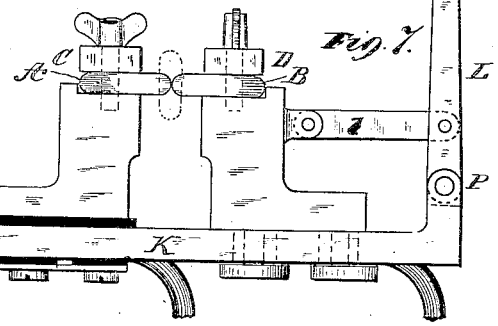 
Fig. 8.   Fig. 9.   Fig. 10.
Fig. 11.   Fig. 12.   Fig. 13. 
Fig. 14.   Fig. 15. 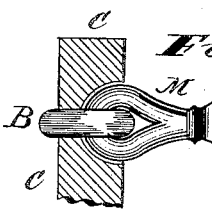  Fig. 16. 
WITNESSES:
Gabriel J. W. Galster.
Wm. H. Capel.
INVENTOR,
Elihu Thomson
BY
Townsend & MacArthur
ATTORNEYS.

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

METHOD OF ELECTRICALLY WELDING CHAINS AND LINKS.

SPECIFICATION forming part of Letters Patent No. 385,385, dated July 3, 1888.

Application filed August 22, 1887. Serial No. 217,503. (No model.)

*To all whom it may concern:*

Be it known that I, ELIHU THOMSON, a citizen of the United States, and a resident of Lynn, in the county of Essex and State of Massachusetts, have invented certain new and useful Improvements in Electrically Welding Chains and Links, of which the following is a specification.

My present invention relates to the construction of links, rings, and other endless shapes of metal; and it consists in a novel method of forming the same, in which I utilize the process of welding or brazing by the agency of a heavy electric current passing through the pieces to be joined in volume sufficient to heat the same to the temperature required for the welding or brazing operation.

In carrying out my invention I preferably employ the process of electric welding described in my prior patent, No. 347,140.

My invention consists in forming the link, ring, or other endless shape from two bent loops or U-shaped portions, which are united at their free or open ends where opposed to form links complete in themselves by passing a heavy electric current from one portion to the other across the bent or disunited free ends and of a volume sufficient to permit the parts to be welded by pressure or to cause them to be joined by means of a proper soldering or brazing material. The two bent loops or U-shaped portions forming the complete link may be preliminarily formed from separate pieces, or, as will hereinafter appear, they may constitute parts of a single piece bent into the two desired loops, so that said loops are in part integral with one another before the electric welding, brazing, or soldering operation takes place.

A link or ring formed by my invention may be made in different shapes, as desired, and a number of them may be combined in a chain, as will be hereinafter set forth. Single links of any desired shape may be formed by my invention for use in coupling cars or for other purposes.

Figure 4:
Figure 6:
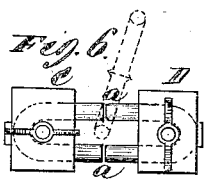
Figure 5:
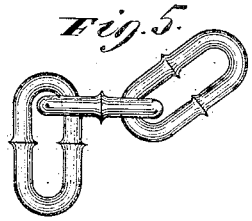

In the accompanying drawings, Figure 1 shows the parts of a single link before being united. Fig. 2 shows the link completed. Figs. 3 and 4 illustrate a modified form of link. Fig. 5 shows a part of a chain made according to my invention. Figs. 6 and 7 show in plan and side elevation an apparatus that may be employed in the practice of my invention. Fig. 8 shows the link finished in a special manner for a specific purpose. Fig. 9 shows the parts of a modified form of link prior to union. Fig. 10 shows a complete link formed from such parts. Fig. 11 illustrates a twisted link. Figs. 12, 13, and 14 illustrate another form of link made in accordance with my invention. Fig. 15 illustrates in cross-section an improvement in the form of a clamp to be used in making chains. Fig. 16 shows a form of link in which the two loops or bent portions are formed from a single bar and are afterward welded at their opposed parts where the ends of the bar are located to form a complete link with a result similar to that obtained by the form of loop shown in Figs. 12 and 13.

In Fig. 1 the parts of the link are shown as simple U-shaped or horseshoe-shaped bars of round or other shaped section and of iron or other metal or metals. In fact, any metal may be used in my electric welding method, and even many different metals for ornamental purposes may be united in the same link, or links of alternately different metals may be united in the same chain. Thus steel and German silver may, respectively, be used for the two halves of the same link, or links of steel may alternate with those of German silver in a chain, or other combinations of metals may be made.

In chains for jewelry composite links may be made of platinum and gold loops united, or links of gold may alternate with those of platinum, or other combinations be made. Where strength is required, the links may be made of steel or iron pieces united, or a combination of the two. After the welding of the pieces shown in Fig. 1, the link takes the form of Fig. 2, usually with expansions at the welded portions or joints.

The pieces may be bent together at their free ends before welding, as in Fig. 3, and after welding pressed to the appearance shown in Fig. 4. Here the link is practically closed or even partly welded laterally at its center, leaving two openings—one at each end.

Fig. 5 shows part of a chain of links, such as are shown in Fig. 2. The chain is made by welding the links so as to include a previously-formed link.

The preferred mode of conducting the welding is indicated in Figs. 6 and 7.

Fig. 6 is a top view of clamps C D, each holding a half-link abutted with pressure at *a a*. A previously-formed link may be included, as indicated in dotted lines, the parts of the new link being threaded through it. The clamps are made to hold the links firmly in place during welding, which is accomplished by a heavy electric current passing from clamp to clamp through the abutted ends of the link-sections *a a*.

In Fig. 7 the clamped pieces A B are the parts of the link seen on edge, and the clamps C D hold them firmly in place and abutted. A lever, L, and link *l* or other connection is provided, whereby the handle H may be used to push clamp D toward C during welding. The clamp C is fixed to a bed-plate, K, but insulated therefrom, lever L being pivoted to the plate K at P. The sliding clamp D may be otherwise suitably impelled toward C, and each clamp is solidly connected with a terminal from the source of currents which generates heat at the abutted portions of the link-sections sufficient to soften and weld them, assisted by the movement of the clamp D toward C. After welding, the expansion or burr at the weld may be removed in whole or in part by hammering while hot or by grinding. It is often an advantage, however, to allow it to remain and to purposely form it so that it shall project inward at the link-center, as *b*, Fig. 8, to such an extent as to act effectually as a stop or barrier to the passage of a neighboring link of the chain across the center of the link. This prevents kinking or knotting of the completed chain.

It is usual in chain-making to weld in a piece or so shape the chain-links as to secure the result just mentioned, and it may be secured in my invention by welding in a cross-piece, *b*, between the link-sections, Fig. 9, and finishing it as in Fig. 10. Twisted chains or links may be made by twisting the chain or links to the shape Fig. 11 either during, before, or after the welding, as desired, while the metal is hot or after it has cooled. The holding-clamps C D, in fact, may readily have movements given for this purpose if so constructed as to permit it.

In Fig. 12 the link-section is shown as modified, so that its ends are nearly half-circular in section, and together form a nearly-round end, *a*, for the link-section. By this construction a link in the form of Fig. 13 may be secured by welding two such pieces, Fig. 12, into one link with the loops in the same plane, or when the loops are placed in planes at right angles a link of the form shown in Fig. 14 may be welded with equal facility. Of course the parts may be hammered and shaped during welding or immediately thereafter, and while the abutted ends of the pieces are still hot.

In Fig. 15 is shown a form of clamp that may be used in making chain with such links as are shown in Figs. 13 and 14. The clamp C C has a space cut out in it at its rear to admit the link M, over which the new link-section B has been bent before insertion into the welding-clamps. In fact, in preparing the parts of a chain to be made of links such as are shown in Figs. 13 and 14, the half-links or interlinked loops of adjacent links should be bent together or one on the other, so that all there is to be done is to weld the ends *a*, Fig. 12, successively to form a continuous chain of links.

The form, Fig. 16, is an unimportant modification, in which the bar has been bent into two loops to make an 8-shaped figure and the welding done at the middle of the link *a a*. This is easily accomplished by the use of the clamps C D for passing current across the middle section of the link and by compression of the link endwise at the same time.

I do not limit myself to the employment of the electric welding operation hereinbefore described, as the union of the loops may be effected by the operation of electric brazing or soldering, the method in this case involving simply the employment of suitable material supplied to the joint and the passage of the heavy electric current through the parts in the neighborhood of the joint in volume sufficient to perfect the desired union. The process of electric brazing or soldering is not, however, herein specifically claimed, as it forms the subject of a separate application for patent filed by me August 22, 1887, Serial No. 247,507.

I do not claim in this application the clamp recessed at its rear, as hereinbefore shown and described, but will make this feature of the apparatus the subject of a separate application for patent.

I do not claim herein a new article of manufacture consisting of a chain having its links electrically welded or brazed; nor do I claim herein a new article of manufacture consisting of closed links made in two looped or bent sections and welded electrically; nor do I claim herein an electrically welded or brazed chain having its links composed of two U-shaped pieces welded or brazed at their bent ends, as these new articles will form the subject of a separate patent.

What I claim as my invention is—

1. The herein-described process of manufacturing links, rings, and other endless shapes of metal, consisting in forming two U or horse-shoe shaped portions, placing the open or free ends of the same together, and then passing a welding, soldering, or brazing current of electricity across the joint between the two halves or portions, as and for the purpose described.

2. The herein-described process of manufacturing chains, which consists in forming looped, bent, or horseshoe-shaped pieces, placing the two free ends of one piece in contact with the two free ends of another while threaded through a formed link, and passing an electric current across the joint from one piece to the other of a volume sufficient to heat the same to the requisite welding, soldering, or brazing temperature.

Signed at Lynn, in the county of Essex and State of Massachusetts, this 18th day of August, A. D. 1887.

ELIHU THOMSON.

Witnesses:
GEORGE STUART,
OTIS K. STUART.